United States Patent
Alshaarawi et al.

(10) Patent No.: US 11,454,070 B2
(45) Date of Patent: Sep. 27, 2022

(54) ROTATIONAL POWER SLIPS

(71) Applicant: Saudi Arabian Oil Company, Dhahran (SA)

(72) Inventors: Amjad Alshaarawi, Dhahran (SA); Haytham H. Alhamed, Al Khobar (SA); Meshari M. Alshalan, Dhahran (SA); Abdulwahab Al-Johar, Dhahran (SA); Mohammad Saud Al-Badran, Dhahran (SA); Chinthaka P. Gooneratne, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 360 days.

(21) Appl. No.: 16/786,305

(22) Filed: Feb. 10, 2020

(65) Prior Publication Data
US 2021/0246739 A1    Aug. 12, 2021

(51) Int. Cl.
*E21B 19/10* (2006.01)
*E21B 17/02* (2006.01)
(Continued)

(52) U.S. Cl.
CPC .......... *E21B 19/10* (2013.01); *E21B 17/0283* (2020.05); *E21B 19/161* (2013.01);
(Continued)

(58) Field of Classification Search
CPC ...... E21B 19/10; E21B 19/102; E21B 19/161; E21B 19/168; E21B 19/164; E21B 19/163; E21B 19/162
See application file for complete search history.

(56) References Cited

U.S. PATENT DOCUMENTS 3,457,605 A * 7/1969 Kingsbury .............. E21B 19/10
188/67
6,896,048 B2 * 5/2005 Mason .................... E21B 19/10
166/78.1
(Continued)

FOREIGN PATENT DOCUMENTS

GB          2 014 215 A      8/1979
WO    WO-2015/167330 A1    11/2015
WO    WO-2021/161078 A1     8/2021

OTHER PUBLICATIONS

International Search Report for PCT/IB2020/053023, 5 pages (dated Oct. 9, 2020).
(Continued)

*Primary Examiner* — Giovanna Wright
*Assistant Examiner* — Nicholas D Wlodarski
(74) *Attorney, Agent, or Firm* — Osha Bergman Watanabe & Burton LLP

(57) ABSTRACT

A rotational power slips system includes a static base comprising at least one circular opening; a rotating ring disposed within the static base and including a circular outer surface interfacing with the static base; at least one slips wedge disposed within the rotating ring and including a radially inner grip surface for gripping at least one component of a drilling string; and at least one wedge actuator disposed on the rotating ring and rotatably coupled to both the rotating ring and the slips wedge, thereby causing the slips wedge to move while the component of a drilling string is rotating.

30 Claims, 6 Drawing Sheets

(51) Int. Cl.
*H02J 50/05* (2016.01)
*H02J 50/12* (2016.01)
*E21B 19/16* (2006.01)
*H02J 50/40* (2016.01)

(52) U.S. Cl.
CPC .............. *H02J 50/05* (2016.02); *H02J 50/12* (2016.02); *H02J 50/40* (2016.02)

(56) References Cited

U.S. PATENT DOCUMENTS

| | | |
|---|---|---|
| 7,293,618 B2 | 11/2007 | Belik |
| 7,467,676 B2 | 12/2008 | Mong et al. |
| 9,175,554 B1 * | 11/2015 | Watson ................. E21B 43/128 |
| 9,347,282 B1 | 5/2016 | Sipos |
| 9,897,240 B2 | 2/2018 | Kearns et al. |
| 10,053,933 B2 | 8/2018 | Duhon |
| 10,316,614 B2 | 6/2019 | Fripp et al. |
| 2016/0168928 A1 | 6/2016 | Magnuson |
| 2016/0340997 A1 | 11/2016 | Bertelsen |
| 2019/0144733 A1 | 5/2019 | Fripp et al. |

OTHER PUBLICATIONS

Written Opinion for PCT/IB2020/053023, 8 pages (dated Oct. 9, 2020).

* cited by examiner

ROTATIONAL POWER SLIPS

FIELD

The subject matter described herein relates to apparatuses, systems, and methods for enabling continuously rotating drilling equipment at drilling sites.

BACKGROUND

In modern drilling operations, drilling strings may include multiple drill pipes screwed together. In order to continue drilling, an increase or decrease in the length of the drilling string is often required, and may be done by adding or removing drill pipes. These processes are referred to as making connections and breaking connections. While a connection is being made or broken, the drilling string is hung on a rotary table using "slips" or "power slips," which are used in drilling operations to hang the top of a drilling string on a rotary table. Typical slips are designed to support stationary, vertical loads (that is, the weight of the stationary drilling string). Historically, additional efforts have been made to develop more advanced slips designs. These designs allow for remote engaging and disengaging of the slips.

In Rotational Continuous-Circulation Systems (RCCS), a system that continuously rotates while connections are being made or broken, the rotation is provided through the rotary table. This, however, is considered risky for at least two reasons. First, the size and the material choice of the wedges and gripping elements are designed to only account for the vertical load of the drilling string (that is, the weight of the string). While rotating, the wedges are subjected to higher stresses (that is, the additional torsional stresses), which presents the possibility of the drilling string falling. Secondly, the rotation of the string creates a torsional deformation in the drilling string. If the drilling crew tries to manually remove the slips, there is a risk of this deformation being released. This can cause a sudden, rapid motion of the drilling string and the slips. This, in turn, might cause serious injuries to the crew.

In typical pneumatically-operated power slips, rotation of the drill string is not possible when the slips are engaged. Periodic non-rotation of the drilling strings, casing, or completion may lead to stuck-pipe incidents, which cost oil and gas companies millions of (US) dollars every year.

SUMMARY

The present disclosed embodiments include apparatuses, systems, and methods for allowing for rotation of the drilling string while the slips are engaged on the drilling string. Additionally, due to the additional risks involved while rotating a drilling string, the present embodiments help to automate the processes of engaging and disengaging the slips in continuous-rotation mode. The present embodiments allow for safe, continuous rotation of the drilling string while power slips are engaged and disengaged.

In one aspect, the present invention is directed a rotational power slips system including: a static base including at least one circular opening; a rotating ring disposed within the static base and including a circular outer surface interfacing with the static base; a plurality of slips wedges disposed at least partially within the rotating ring, each slips wedge including a radially inner grip surface for gripping a component of a drilling string; and a plurality of wedge actuators, each wedge rotatably coupled to both the rotating ring and at least one slips, thereby causing the plurality of slips wedges to move while the at least one component of the drilling string is rotating.

In some embodiments, the system includes contactless electrical power system for transferring power between the static base and the rotating ring.

In some embodiments, the contactless electrical power system transfers power to a motor disposed on or within the rotating ring.

In some embodiments, the contactless electrical power system includes an inductive power transfer system including: an inductance track disposed in the static base and extending circumferentially around the rotating ring; and an inductor coil disposed within the rotating ring, the inductor coil electrically coupled to the motor.

In some embodiments, the contactless electrical power system includes a capacitive power transfer system including: an outer capacitor plate disposed within the static base; and an inner capacitor plate disposed within the rotating ring, the inner capacitor plate facing the outer capacitor plate, where the inner capacitor plate is electrically coupled to the motor.

In some embodiments, at least one of the outer capacitor plate and the inner capacitor plate comprises an electrolytic solid disposed thereon.

In some embodiments, the at least one electrolytic solid comprises at least one of a polymer wear material, manganese dioxide $MnO_2$, PEDOT, and poly-pyrrole (polypyrrole).

In some embodiments, a liquid electrolyte is disposed between the outer capacitor plate and the inner capacitor plate.

In some embodiments, the liquid electrolyte includes at least one of ethylene glycol, boric acid, dimethylformamide, and dimethylacetamide.

In some embodiments, the system includes: a first dynamic seal disposed longitudinally above the liquid electrolyte; and a second dynamic seal disposed longitudinally below the liquid electrolyte.

In some embodiments, at least one of the outer capacitor plate and the inner capacitor plates includes at least one of a copper material, an aluminum oxide material, a tantalum pentoxide material, and a niobium oxide material.

In some embodiments, the outer capacitor plate is concavely contoured, when viewed from an interface between the static base and the rotating ring, and where the inner capacitor plate is convexly contoured, when viewed from the interface between the static base and the rotating ring.

In some embodiments, the contactless electrical power system comprises a resonant power transfer system including: an outer inductor coil disposed in the static base; and an inner inductor coil disposed within the rotating ring, the inner inductor coil electrically coupled to the motor.

In some embodiments, the outer inductor coil and the inner inductor coil are arranged such that each respective inductor coil centerline is oriented in a radial direction.

In some embodiments, the system includes a capacitor electrically coupled to both the inner inductor coil and the motor.

In some embodiments, in a closed position of the rotational power slips system, the component of the drilling string is hung from the rotating ring via the plurality of slips wedges.

In some embodiments, in an open position of the rotational power slips system, the component of the drilling string does not contact any of the plurality of slips wedges.

In some embodiments, each wedge actuator is coupled to both the top of the rotating ring and the top of a slips wedge.

In some embodiments, each wedge actuator is coupled to both a radially inner surface of the rotating ring and a circumferentially facing surface of slips wedge of the plurality of slips wedges.

In some embodiments, the system includes a dynamic seal disposed at the interface between the rotating ring and the static base, the dynamic seal extending circumferentially around the rotating ring, radially outward of the rotating ring.

In some embodiments, the system includes a hydraulic power source disposed on the static base for transmitting power from the static base to the rotating ring, where the hydraulic power source is fluidly coupled to the plurality of wedge actuators.

In some embodiments, the hydraulic power source includes: a hydraulic fluid pressure source; a stationary fluid path fluidly coupled to the hydraulic fluid pressure source; a stationary fluid manifold fluidly coupled to the stationary fluid path; and a rotating fluid path fluidly coupled to both the stationary fluid manifold and at least one wedge actuator.

In some embodiments, the stationary fluid manifold extends circumferentially around the power slips system, radially outward of the rotating ring.

In some embodiments, each of the stationary fluid path, the stationary manifold, and the rotating fluid path are at least partially disposed within at least one of the static base and the rotating ring.

In some embodiments, the system includes a sleeve bearing disposed at an interface between a static component and a rotating component.

In some embodiments, the system includes an O-ring seal disposed at an interface between a static component and a rotating component.

In another aspect, the present invention is directed to a rotational power slips system including: a static system; and a rotating system disposed within a circular opening within the static system, the rotating system rotating within the static system, the static system vertically supporting the rotating system, the rotating system further including: a rotating ring; a plurality of wedge actuators coupled to the rotating ring; and a plurality of slips wedges, where each slips wedge is coupled to at least one wedge actuator, and where the plurality of wedge actuators cause the plurality of slips wedges to move vertically while the rotating system rotates in a circumferential direction.

In another aspect, the present invention is directed to a system for making or breaking a drilling string connection including: a static system; a rotating system disposed within the static system, the rotating system including: a rotating ring interfacing with the static system; a plurality of wedge actuators coupled to the rotating ring; a plurality of slips wedges; and a drilling string disposed radially inward of the plurality of slips wedges, where each slips wedge is coupled to at least one wedge actuator and, in a closed position, the rotating ring, the plurality of wedge actuators, the plurality of slips wedges, and the drilling string rotate at the same rotational speed.

In some embodiments, the plurality of slips wedges engage the drilling string while both of the plurality of slips wedges and the drilling string are rotating.

In some embodiments, the plurality of slips wedges disengage the drilling string while both the plurality of slips wedges and the drilling string are rotating.

In some embodiments, the liquid electrolyte includes at least one organic solvent.

Throughout the description, where an apparatus or systems are described as having, including, or comprising specific components, or where methods are described as having, including, or comprising specific steps, it is contemplated that, additionally, there are systems, or apparatuses of the present invention that consist essentially of, or consist of, the recited components, and that there are methods according to the present invention that consist essentially of, or consist of, the recited processing steps. These and other features, aspects and advantages of the present invention will become better understood with reference to the following description and appended claims.

It should be understood that the order of steps or order for performing certain action is immaterial as long as the invention remains operable. Moreover, two or more steps or actions may be conducted simultaneously.

The following description is for illustration and exemplification of the disclosure only, and is not intended to limit the invention to the specific embodiments described.

The mention herein of any publication, for example, in the Background section, is not an admission that the publication serves as prior art with respect to any of the present claims. The Background section is presented for purposes of clarity and is not meant as a description of prior art with respect to any claim.

BRIEF DESCRIPTION OF THE DRAWINGS

A full and enabling disclosure of the present disclosed embodiments, including the best mode thereof, directed to one of ordinary skill in the art, is set forth in the specification, which refers to the appended figures, in which.

DESCRIPTION OF CERTAIN EMBODIMENTS OF THE INVENTION

Figure 1:
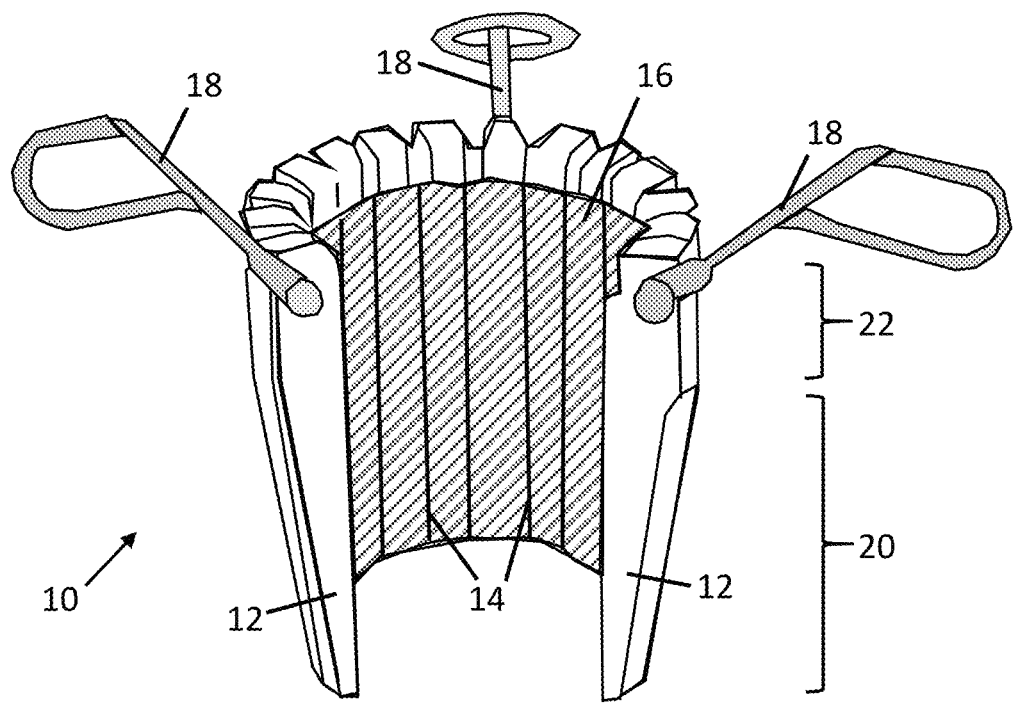
FIG. 1 illustrates a perspective view of a slips device.

Reference will now be made in detail to the present disclosed embodiments, one or more examples of which are illustrated in the accompanying drawings. The detailed description uses numerical and/or letter designations to refer to features in the drawings. Like or similar designations in the drawings and description have been used to refer to like or similar parts of the present embodiments.

The present disclosed embodiments include apparatuses, systems, and methods for drill pipe connections to be hung on a rotary table without requiring a drilling string to stop rotating, thereby reducing the likelihood of a stuck pipe occurrence. The present disclosed embodiments include wedge actuators in or on a rotating system, allowing slips wedges to engage or disengage a drill string, without requiring intervention from sources external to the rotating system (for example, no human assistance is required). Movement of the wedge actuators may be enabled by power transfer between static and rotating parts via hydraulic power sources, pneumatic power sources, or contactless electrical power transfer.

FIG. 1 illustrates a perspective view of a slips device 10, which may be used to grip a drilling string while a pipe connection is being made or broken. The slips may include a plurality of wedges 12 hingedly connected to one another at one or more hinge joints 14, that allow the wedges 12 to be wrapped around a drill pipe or drilling string such that they may form a tight grip thereabout. The radially inner surface of each wedge may include a grip surface 16, which may include diagonal lines, horizontal lines, vertical lines, curved lines, round buttons, horizontal teeth, pins, or other gripping features including a uniformly rough surface finish. Each wedge 12 may include a tapered portion 20 that may allow the slips 10 to be inserted into a hole in the rotary table 24 (shown in FIG. 2) such that as the outer diameter increases, the outer surfaces of each of the wedges 12 contact the inner circumference of the hole, thereby providing a tight fit between the slips 10 and the hole. Each wedge 12 may also include a collar portion 22 disposed longitudinally above the tapered portion. One or more levered handles 18 may be disposed around the collar portion 22 for providing circumferential, axial (or longitudinal), and radial torque to the slips 10.

Figure 2:
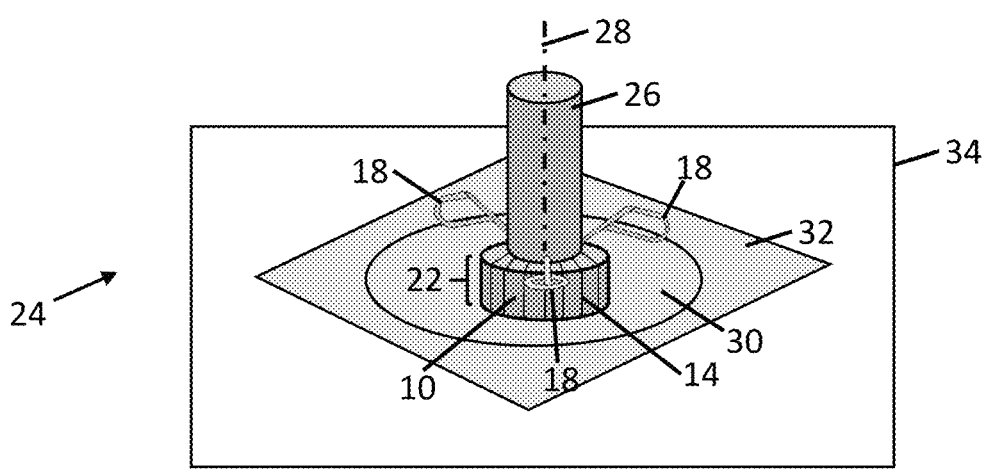
FIG. 2 illustrates a perspective view of a rotary table assembly.

FIG. 2 illustrates a perspective view of a rotary table assembly 24 including the slips 10, the handles 18, the hinge joints 14, and the collar portion 22 radially disposed around a drill pipe 26 (or drilling string) which includes a centerline 28 concentrically disposed therethrough. The rotary table assembly 24 may be disposed within a rig floor 34 and may include a static base 32, and a rotating ring 30 disposed within the static base 32.

Rotational Power Slips

Figure 3:
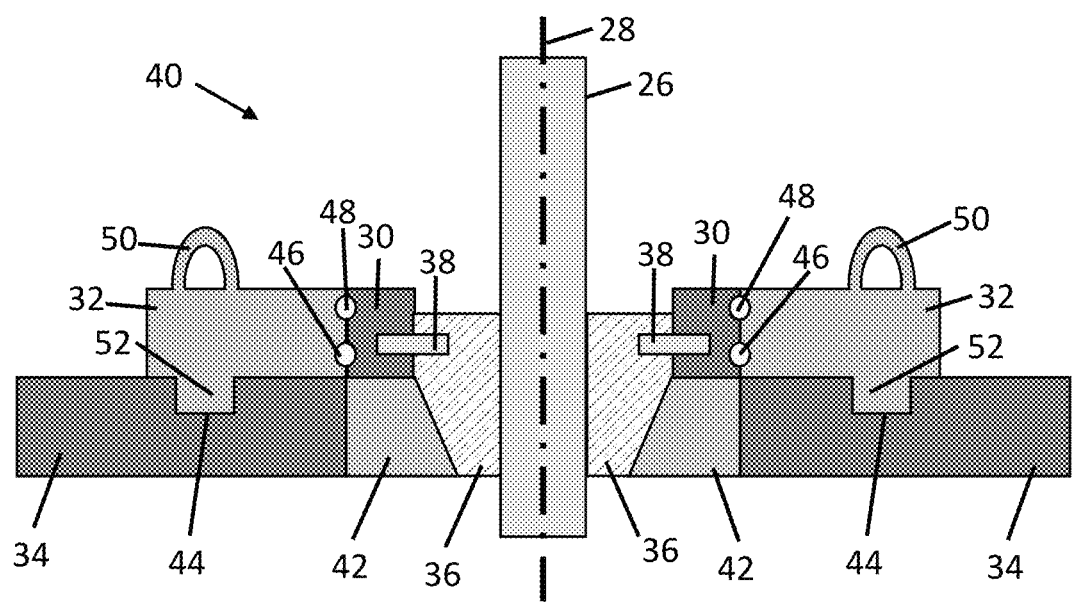
FIG. 3 illustrates a side view of a power slips system, in accordance with aspects of the present disclosed embodiments.

FIG. 3 illustrates a side view of a power slips system 40 according to the present disclosed embodiments. The power slips system 40 may include one or more slips wedges 36 radially disposed about the drill pipe 26 and centerline 28, and radially within the rotating ring 30, and static base 32. As such the static base 32 may include a circular opening into which the rotating ring 30 fits, the rotating ring 30 including a circular outer surface interfacing with the static base. Each of the slips wedges 36 may be used to grip the drill pipe 26 and hold it securely while connections are being made or broken. The one or more slips wedges 36 may be moved into place via one or more wedge actuators 38, which may be rotatably coupled to one or more slips wedges 36, as well as the rotating ring 30. The one or more slips wedges 36 may include a radially inner grip surface (that is, similar to grip surface 16 illustrated in FIG. 1). Each of the slips wedges 36, the wedge actuators 38, the rotating ring 40, as well as the rotary table 42 (disposed under the rotating ring 30) may rotate together with the drill pipe 26 radially within the rig floor 34, and the stationary base 32. As such, in operation, each of the slips wedges 36, the wedge actuators 38, the rotating ring 40, the rotary table 42, and the drill pipe 26 may rotate at the same angular speed (in revolutions per minute or radians per second, for example), while the static base 32 and the rig floor 34 remain stationary. The one or more wedge actuators 38 may include a set of arms connected via a hinge or axle connection at both sides of the slips wedges 36, and may be similarly coupled to the rotating ring 30. The one or more wedge actuators 38 may also include a piston connecting one or more slips wedges to the rotating ring via one or more hinges as described. In other embodiments, the one or more wedge actuators 38 may include arms mounted to the top of the rotating ring 30 that rotate and pull the slips wedges 36 upward and lower the slips wedges 36 back down again, as needed. The one or more wedge actuators 38 may also employ a linkage system including multiple linkages. The one or more wedge actuators 38 may be actuated via one or more motors 110 (shown in FIGS. 11, 12, 14, and 15) coupled to the rotating ring 30 that receives power via one or more contactless electrical power transfer systems. In other embodiments, the one or more wedge actuators 38 may be actuated via pneumatic or hydraulic power. Each of the slips wedges 36 may include increased dimensions when compared to conventional slips wedges, thereby enabling the slips wedges 36 of the present embodiments to absorb higher torques and forces, which in turn enables the slips wedges 36 to more tightly grip the drill pipe 26 or other component of the drilling string.

Referring still to FIG. 3, the power slips system 40 may include at least one dynamic seal 48 disposed at an interface between the static base 32 and the rotating ring 30. The at least one dynamic seal 48 may form a ring that circumferentially and concentrically surrounds both the rotating ring 30 and the drill pipe 26 or drilling string. The dynamic seal 48 may include a rubber O-ring or gasket that is in tension around the rotating ring 30 (that is, it stretches to fit around the rotating ring 30) such that it rotates with the rotating ring 30. The dynamic seal 48 may also include an O-ring or gasket that is composed of a metallic, composite, or polymer material that has a smaller hardness value than the materials of each of the rotating ring 30 and the static base 32. As such, the O-ring or gasket may partially conform to or comply with each of rotating ring 30 and the static base 32, thereby maintaining a continuous contact between the two components and preventing fluids (that is, liquids and gases) from longitudinally flowing, migrating, or leaking between the rotating ring 30 and the static base 32. The power slips system 40 may include a second dynamic seal 46 also disposed at the interface between the static base 32 and the rotating ring 30, and also radially surrounding the rotating ring 30. By employing both a first dynamic seal 48 as well as a second dynamic seal 46 disposed longitudinally below the first dynamic seal 48 and spaced therefrom, the power slips system 40 enables the rotating ring 30 and slips wedges 36 to remain longitudinally aligned about the drill string 26 and centerline 28, thereby minimizing wobbling and misalignment. In addition, employing both a first dynamic seal 48 as well as a second dynamic seal 46 enables additional sealing (or more specifically, a pressure drop across which any leakage flows must traverse between the rotating ring 30 and the static base 32, in order to reach the ambient environment at the top of both the borehole and power slips system 40).

Still referring to FIG. 3, each of the rotating ring 30 and static base 32 may include one or more grooves, trenches, gullies, pathways, concavities, contours, notches, and other features 58 (shown in FIG. 4) disposed therein that may radially surround the rotating ring 30 allowing a space approximately equal to the thickness of the O-ring or gasket 48, 46 to fit between the rotating ring 30 and the static base 32. Each of the slips wedges 36 may include a rough or grip surface, similar to the grip surface 14 disposed on the interior of the slips 10 illustrated in FIG. 1. The wedge shape of the slips wedges 36 allows them to tightly fit within the rotating ring 30 and rotary table 42, which, along with the grip surface between the slips wedges 36 and the drill pipe 26, helps to prevent leakage flow and pressure loss across the power slips system 40, both radially inward and radially outward of the slips wedges 36. The power slips system 40 may include one or more lifting rings 50 disposed on the top surface of the static base 32 allowing the system or components thereof to be lifted via crane, forklift, or other equipment. The power slips system 40 may also include one or more locking features 52 disposed in the bottom surface of the static base 32, the one or more locking features 52 protruding downwardly from the bottom surface of the static base 32 and approximating the shape and size of one or more locking holes 44 disposed within the top surface of the rig floor 34. In one example, each of the locking features 52 as well as the locking holes may include a square or rectangular cross section thereby securely coupling the static base 32 to the rig floor 34, preventing the static base 32 from rotating with the rotating ring 30, slips wedges 36, wedge actuators 38, and drill pipe 26. Each of the locking features 52 may be secured within the locking holes 44 via compression fit, pins, clasps, clamps, screws, ring-clamps, as well as other suitable couplings.

Figure 4:
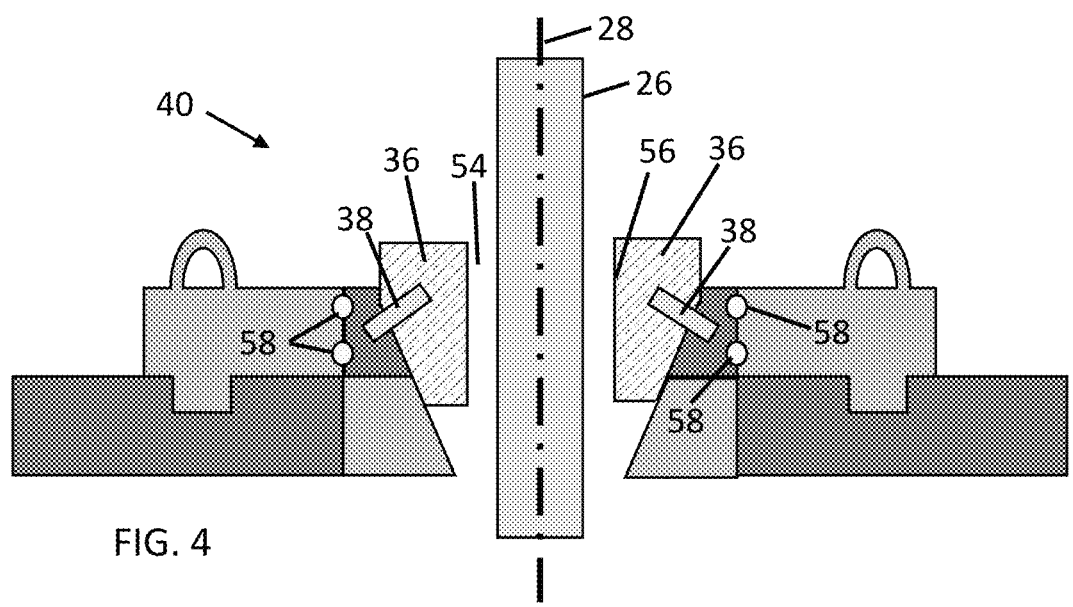
FIG. 4 illustrates a side view of a power slips system, in accordance with aspects of the present disclosed embodiments.

FIG. 4 illustrates a side view of the power slips system 40 including the drill pipe 26, centerline 28, slips wedges 36, and wedge actuators 38. Also illustrated in FIG. 4 are the circumferential grooves 58 into which the O-rings or gaskets 46, 48 may fit. In the embodiment of FIG. 4, the slips wedges 36 have been rotated up via the wedge actuators 38 such that the slips wedges 36 are no longer contacting the drill pipe 36, thereby creating a radial gap 54 between the outer surface of the drill pipe 26 and the radially inner surface 56 of the slips wedges 36. In operation, the power slips system 40 may adjust the slips wedges 36 (via the wedge actuators 38) from the closed position of FIG. 3, to the open position of FIG. 4. When a drill pipe 26 or drilling string requires a connection to be broken or made, the wedge actuators 38 may move the slips wedges 36 around the drill pipe 26 into the closed position of FIG. 3, thereby allowing the drill string to be hung from (that is, vertically supported by) the rotary table 42 while continuing to rotate (that is, via the rotary table 42). Once the connection has been made or broken, the wedge actuators 38 may then move the slips wedges 36 to the open position of FIG. 4, thereby releasing the drill pipe 26 or drilling string, while allowing the drilling string to continue to rotate (that is, via a top drive system (TDS), kelly, or other turning gear or device). By engaging and disengaging the drilling string (or drill pipe 26) when a connection is being made or broken, the power slips system 40 allows rig operators to stay a safe distance away from the drill string 26, thereby reducing the chances of injury due to trapped torsion that is suddenly released.

Figure 5:
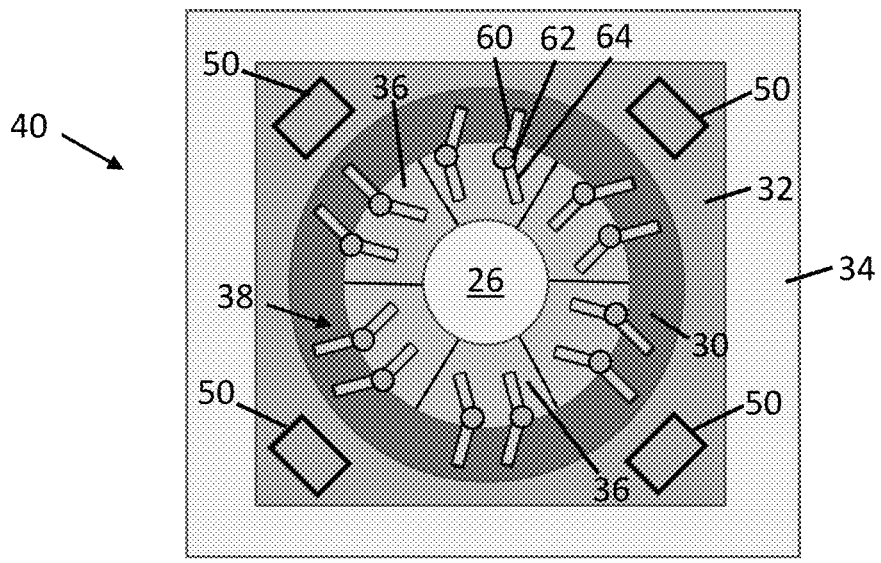
FIG. 5 illustrates a top view of a power slips system, in accordance with aspects of the present disclosed embodiments.

FIG. 5 illustrates a top view of the power slips system 40 including the rig floor 34, the static base 32, the rotating ring 30, and multiple lifting rings 50. FIG. 5 also illustrates six (6) slips wedges 36 circumferentially surrounding the drill pipe 26 in a closed position (that is, similar to the closed position of FIG. 3). In other embodiments, the power slips system 40 may include anywhere from two (2) to about forty (40) slips wedges 36. For example, the power slips system 40 may include from about three (3) to about thirty (30) slips wedges 36, from about four (4) to about twenty-four (24) slips wedges, from about five (5) to about twenty (20) slips wedges 36, from about six (6) to about eighteen (18) slips wedges 36, or from about eight (8) to about fifteen (15) slips wedges. In the embodiment of FIG. 5, each slips wedge 36 is coupled to the rotating ring 30 via two wedge actuators 38. Each wedge actuator may include a first arm 60 rotatably coupled between the top of the rotating ring 30 and a linkage joint 62, as well as a second arm 64 rotatably coupled between the linkage joint 62 and the top of each slips wedge 36. Each of the wedge actuators 38 may be coupled to a source of power or movement such as an electric motor, or a pneumatic or hydraulic power source. In other embodiments, a single wedge actuator 38 or more than 2 wedge actuators 38 may be coupled to each slips wedge 36 and the rotating ring 30.

Figure 6:
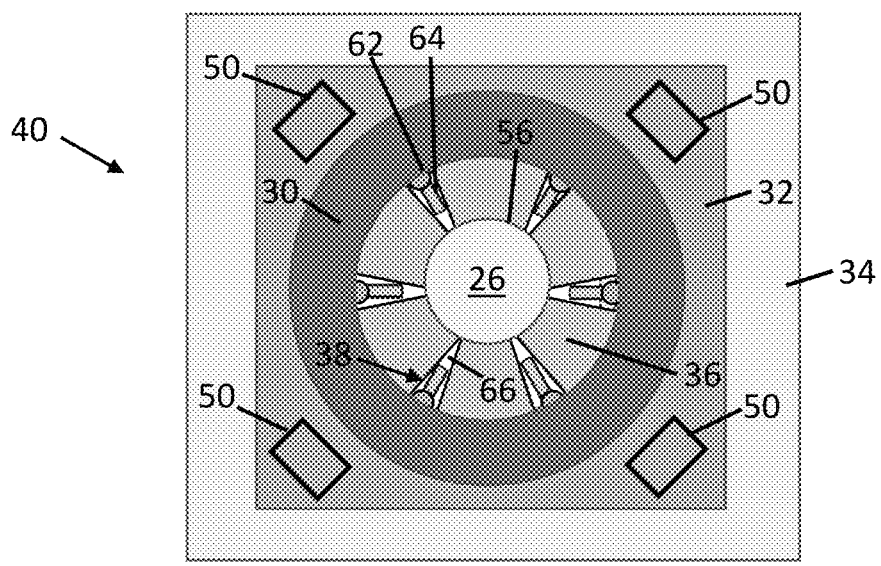
FIG. 6 illustrates a top view of a power slips system, in accordance with aspects of the present disclosed embodiments.

FIG. 6 illustrates a top view of the power slips system 40 including the rig floor 34, the static base 32, the rotating ring 30, and multiple lifting rings 50. FIG. 6 also illustrates six (6) slips wedges 36 circumferentially surrounding the drill pipe 26 in a closed position (that is, similar to the closed position of FIG. 3). In other embodiments, the power slips system 40 may include anywhere from two (2) to about forty (40) slips wedges 36. In the embodiment of FIG. 6, each slips wedge 36 is coupled to the rotating ring 30 via a single wedge actuator 38 including an arm 64 and a linkage joint 62. In the embodiment of FIG. 6, a circumferential space or gap 66 is disposed between each slips wedge 36 such that each wedge actuator 38 may be disposed circumferentially adjacent to each slips wedge 36 (and radially inward of the rotating ring 30) rather than on top of the slips wedge 36 (and rotating ring 30). Stated otherwise, in the embodiment of FIG. 6, each wedge actuator 38 may be coupled to a radially inner surface of the rotating ring 30 and to a circumferentially facing surface of at least one slips wedge 36. In other embodiments, the power slips system 40 may include a wedge actuator 38 disposed circumferentially adjacent to each slips wedge 36 (that is, on either side of each slips wedge 36) such that there are two wedge actuators 38 per slips wedge 36.

In each of FIGS. 3-6, the radially inner surfaces 56 of each slips wedge 36 may be concavely contoured such that they match the contouring of the outer surface of the drill pipe 26. In addition, in each of FIGS. 3-6, the radially inner surfaces 56 of each slips wedge 36 may collectively cover the full 360-degree circumference of the drill pipe 26, or nearly the full 360-degree circumference. For example, in one embodiment, the radially inner surfaces 56 of each slips wedge 36 may collectively cover at least 300-degrees of the drill pipe 26 circumference, thereby maximizing the contact area between the slips wedges 36 and the drill pipe 26 or drilling string, which in turn allows the slips wedges 36 to more tightly grip the drill pipe 26. Each of the wedge actuators 38 may be coupled to a source of power or movement such as an electric motor, a pneumatic power source, or hydraulic power source. In other embodiments, a single wedge actuator 38 or more than 2 wedge actuators 38 may be coupled to each slips wedge 36 and the rotating ring 30, and the configuration may vary from one slips wedge 36 to the next.

Hydraulic Power Transfer

Figure 7:
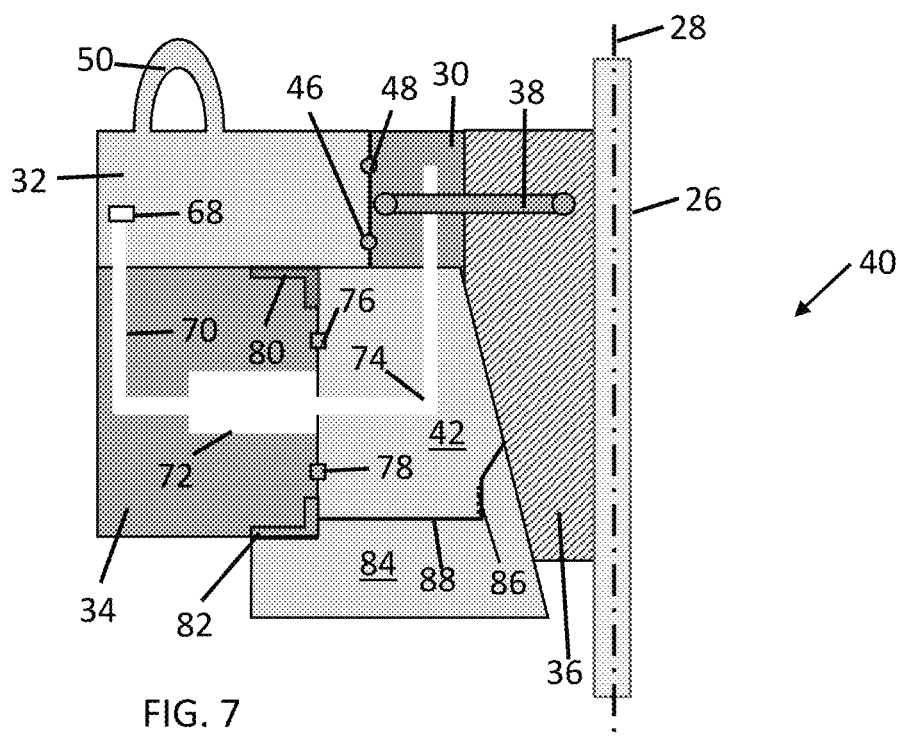
FIG. 7 illustrates a side view of a power slips system, in accordance with aspects of the present disclosed embodiments.

FIG. 7 illustrates a side view of the power slips system 40 according to one aspect of the present embodiments including the drill pipe 26, centerline 28, rig floor 34, rotary table 42, static base 32, rotating ring 30, slips wedge 36, lifting rings 50, first dynamic seal 48, second dynamic seal 46, and one or more wedge actuators 38. In the illustration of FIG. 7, the side view includes the left-hand side of a cross-section of the power slips system 40, which radially surrounds the centerline 28 and drill pipe 26. The power slips system 40 may include one or more stationary fluid paths 70 fluidly connected to a fluid pressure source 68 disposed within the static base 68. The stationary fluid path 70 is oriented vertically within both the static base 32 and rig floor 34, where the stationary fluid path 70 becomes oriented radially inwardly before fluidly connecting to one or more stationary fluid manifolds 72. The one or more stationary fluid manifolds may circumferentially extend (within the rig floor 34) around the outer periphery of the rotary table 42, thereby allowing it to remain in continuous contact with one or more rotating fluid paths 74 disposed in the rotary table 42, even as the rotary table 42 and rotating fluid path 74 rotate. Within the rotary table 42, the one or more rotating fluid path 74 redirects from a radially inward direction to a longitudinally upward direction toward the rotating ring 30, where the rotating fluid path may come into fluid communication with the one or more wedge actuators 38. In operation, the stationary and rotating fluid paths 70, 74, as well as the stationary fluid manifold 72 may be filled with hydraulic or pneumatic fluid, in order to push the wedge actuator 38 vertically upward, which in turn moves the one or more slips wedges 36 into an open position.

Referring still to FIG. 7, the power slips system 40 may include an upper O-ring seal 76 disposed at the interface between the rig floor 34 and rotary table 42, radially inward of the rig floor 34 and radially outward of the rotary table 42. The power slips system 40 may include a lower O-ring seal 78 similarly disposed at the interface between the rig floor 34 and rotary table 42 at a location below the upper O-ring seal 76. Each of the upper and lower O-ring seals 76, 78 may circumferentially extend 360 degrees around the rotary table 42 and may be used as dynamic seals to maintain the hydraulic or pneumatic fluid within the stationary and rotating fluid paths 70, 74, as well as within the stationary fluid manifold 72. The power slips system 40 may include an upper sleeve bearing 80 and a lower sleeve bearing 82, both rigidly coupled to the rotary table 42 and circumferentially extending 360 degrees around the top and bottom of the rotary table 42. The upper sleeve bearing 80 and the lower sleeve bearing 82 hold the rotary table 42 to the rig floor 34, thereby vertically supporting the rotary table, while simultaneously allowing the rotary table 42 (and upper and lower sleeve bearings 80, 82) to rotate within the rig floor 34. As such, the static base 32 and rig floor 34 vertically support the rotating ring 30 and rotary table 42. Each of the upper and lower sleeve bearings 80, 82 may be self-lubricated or alternatively may be lubricated with solid carbon inserts.

The rotary table 42 may include a detachable portion 84 that may be coupled to (or decoupled from) the rotary table 42 via one or more threaded portions 86. The geometry of the detachable portion 84 of the rotary table 42 may be defined by a parting line 88 that includes the threaded portion 86 and generally extends from the bottom of the rig floor 34 radially inward toward the one or more slips wedges 36. In the embodiment of FIG. 7, the one or more slips wedges 36 contacts the drill pipe 26 because the power slips system 40 is in a closed position.

Figure 8:
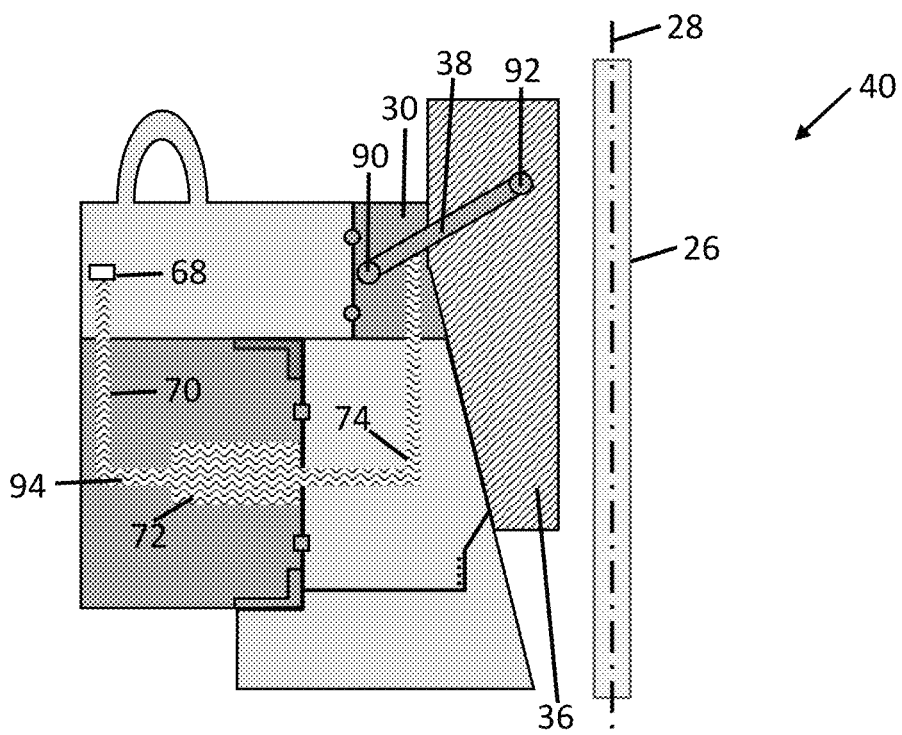
FIG. 8 illustrates a side view of a power slips system, in accordance with aspects of the present disclosed embodiments.

FIG. 8 illustrates an open position of the power slips system of FIG. 7. In the embodiment of FIG. 8, an outer hub 90 may rotatably couple the radially outer end of the wedge actuator 38 to the rotating ring 30, while an inner hub 92 may rotatably couple the radially inner end of the wedge actuator 38 to the slips wedge 36. In the embodiment of FIG. 8, each of the stationary and rotating fluid paths 70, 74, as well as the stationary fluid manifold 72 is filled with hydraulic or pneumatic fluid 94, pushing the wedge actuator 38 vertically upward which in turn moves the one or more slips wedges 36 into an open position. As such, the wedge actuator 38 is angled upwardly in the open embodiment of FIG. 8, whereas it is approximately horizontal in the closed embodiment of FIG. 7. In the embodiment of FIG. 8, the one or more slips wedges 36 does not contact the drill pipe 26 because the power slips system 40 is in an open position.

Figure 9:
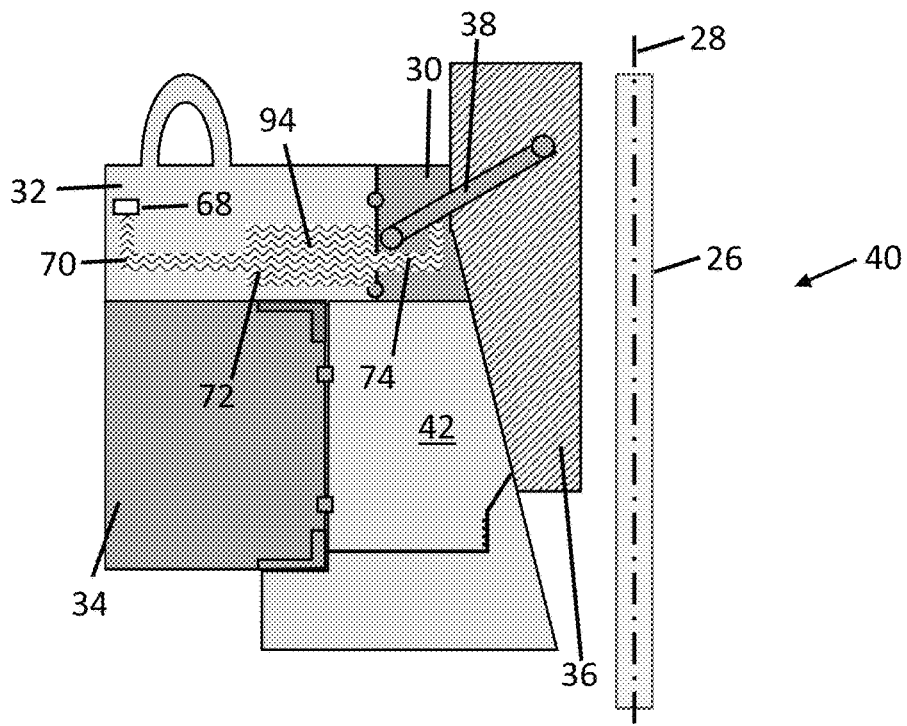
FIG. 9 illustrates a side view of a power slips system, in accordance with aspects of the present disclosed embodiments.

FIG. 9 illustrates an alternate embodiment of the power slips system 40 of FIGS. 7 and 8, in an open position, and including the wedge actuator 38, the slips wedge 36, the drill pipe 26 and centerline 28, as well as the rotating ring 30, and other components. In the embodiment of FIG. 9, the stationary fluid path 70 is routed from the fluid pressure source 68 to the stationary fluid manifold (filled with fluid 94) entirely within the static base 32. Similarly, the rotating fluid path 74 is entirely disposed within the rotating ring 30 as it routes fluid 94 from the stationary fluid manifold 72 to the wedge actuator 38. As such, in the embodiment of FIG. 9, neither the rotating or stationary fluid paths 74, 70, nor the stationary fluid manifold 72 is routed through either the rig floor 34 or the rotary table 42. In operation, each of the embodiments of FIGS. 7-9 transfers power from the static components (for example, the static base 32 and the rig floor) to the rotating components (for example, the rotating ring 30 and the wedge actuator 38) via fluid 94. Because the rotating fluid path 74 remains in continuous fluid communication with the stationary fluid manifold 72 even while the rotating components are rotating, power (and therefore actuating mechanisms) may be transferred into the rotating components via the hydraulic or pneumatic fluid 94. The upper and lower O-ring seals 76, 78 (or the first and second dynamic seals 48, 46) provide sealing at the interface between rotating and static parts, thereby maintain tight fluidic seals while the power slips system 40 is in operation.

Referring still to FIG. 9, each of the components of the power slips system 40 of FIGS. 7-9 may be translated circumferentially around drill pipe 26 and centerline 28, with the noted exceptions of the stationary and rotating fluid path 70, 74, which may include individual or singular flow paths. For example, the stationary fluid path may be a single fluid path connecting the fluid pressure source 68 to the stationary fluid manifold 72. The rotating fluid paths 74 may include a single fluid path for each wedge actuator 38. As such, in one embodiment the power slips system 40 may include an equal number of rotating fluid paths 74 and wedge actuators 38. The stationary fluid manifold 72 must extend circumferentially around the power slips system 40 at the interface with the rotary table 42 or alternatively at the interface with the rotating ring 30 such that the stationary fluid manifold 72 maintains continuous fluid communication with the one or more rotating fluid paths 74, even as the rotating components are rotating. In one or more embodiments, the power slips system 40 may include a fluid pressure source 68 disposed in the rig floor 34 rather than (or in addition to) in the static base 32.

Inductive Power Transfer

Figure 10:
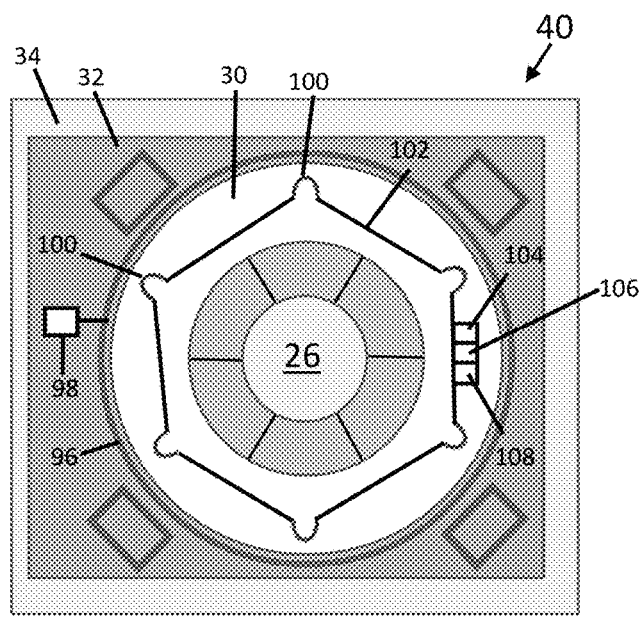
FIG. 10 illustrates a top view of a power slips system, in accordance with aspects of the present disclosed embodiments.

FIG. 10 illustrates a top view of an embodiment of the power slips system 40 according to aspects of the present disclosure. In the embodiment of FIG. 10, the power slips system 40 includes a first contactless electrical power transfer system which includes an inductive power transfer system. The power slips system 40 may include one or more power supplies 98 disposed in the static base 32 (or alternatively in the rig floor 34) electrically coupled to an inductance track 96 that may include a generally circular shape and may be disposed in the static base 32 radially outward of the rotating ring 30. One or more inductor coils 100 may be disposed within the rotating ring 30 proximate the outer diameter of the rotating ring 30 such that the one or more inductor coils 100 may be close to the inductance track 96. In one or more embodiments, each inductor coil 100 is within twelve (12) inches of the inductance track 96. In another embodiment, each inductor coil 100 is within three (3) inches of the inductance track 96. In another embodiment, each inductor coil 100 is within two (2) inches of the inductance track 96. In another embodiment, each inductor coil 100 is within one (1) inch of the inductance track 96. In another embodiment, each inductor coil 100 is within one (1) centimeter of the inductance track 96. In another embodiment, each inductor coil 100 is disposed from about three (3) millimeters to about seven (7) millimeters from the inductance track 96. Each inductor coil 100 may be electrically coupled to one or more adjacent inductor coils 100 via one or more electrical connections 102. In the embodiment of FIG. 10, six (6) inductor coils are illustrated. However, the power slips system 40 may include any suitable number of inductor coils 100 including 1, 2, 3, 4, 5, 7, 8, 9, 10, 20, 50, 100, 200, 500, 1000, higher numbers, and numbers therebetween of inductor coils 100. Each inductor coil 100 may similarly include any suitable number of turns including 1, 2, 3, 4, 5, 7, 8, 9, 10, 20, 50, 100, 200, 500, 1000, higher numbers, and numbers therebetween of turns.

Referring still to FIG. 10, the power slips system 40 may include at least one pickup compensator 108 disposed on the rotating ring 30 and electrically coupled in series with the one or more inductor coils 100. The pickup compensator 108 may be used to match the impedance at the one or more inductor coils 100 to that of the inductance track 96 in order to amplify inductance within the one or more inductor coils 100. In other embodiments, a compensator may be used in connection with the inductance track 96 (that is, the compensator may be disposed within the static base 32) rather than at the inductor coil circuit disposed in the rotating ring 30. The power slips system 40 may also include at least one rectifier 106 electrically coupled to the pickup compensator 108 (or inductor coil circuit) for converting alternating current (AC) power to direct current (DC) power. The power slips system 40 may also include at least one switched mode controller 104 electrically coupled to the rectifier 106 (or inductor coil circuit) for smoothing and regulating the direct current (DC) power from the rectifier 106. The first contactless electrical power transfer system of FIG. 10 may be used with an electrical load (for example a motor, articulator, or other device) disposed within the rotating ring 30. For example, the power slips system 40 may include an electrically driven motor 110 (shown in FIG. 11) for powering the one or more wedge actuators 38, the electrically driven motor 110 being powered by the first contactless electrical power transfer system. Each of the inductor coils 100 and the one or more inductance tracks 96 may be composed of a ferrite material, as well as other suitable materials.

Figure 11:
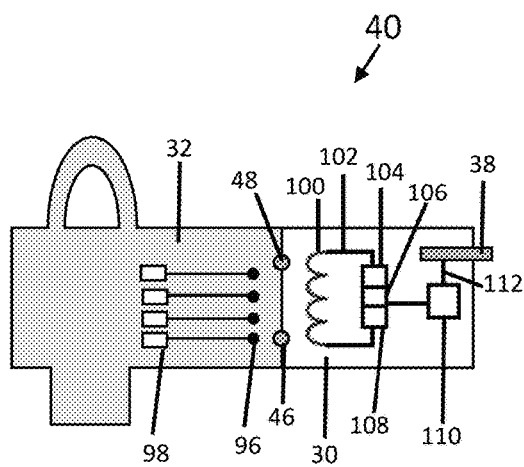
FIG. 11 illustrates a side view of a power slips system, in accordance with aspects of the present disclosed embodiments.

FIG. 11 illustrates a side view of an embodiment of the power slips system 40 according to aspects of the present disclosure, including the first contactless electrical power transfer system illustrated in FIG. 10. The power slips system 40 may include the static base 32, the rotating ring 30, first and second dynamic seals 48, 46, and one or more wedge actuators 38, as well as the first contactless electrical power transfer system, which may include one or more power supplies 98, one or more inductance tracks 96, inductor coils 100, electrical couplings 102, one or more switched mode controllers 104, one or more rectifiers 106, and one or more pickup compensators 108. In the embodiment of FIG. 11, the first contactless electrical power transfer system may include multiple inductance tracks 96 and one or more power supplies 98 spaced longitudinally within the static base 102. In the illustration of FIG. 11, the inductance tracks 96 are illustrated as small circles or dots because in the side view of FIG. 11, the circumferentially extending (ferrite, or other magnetic material) tracks that compose the inductance tracks 96 appear as only a circular (or other-shaped) cross-section when viewed from the side. In other embodiments, the first and second dynamic seals 48, 46 may be located at the interface between the static base 32 and the rotating ring 30, but longitudinally above and longitudinally below the inductance tracks 96 (and inductor coils 100), thereby allowing the inductance tracks 96 and inductor coils 100 to be disposed close to each other. The power slips system 40, as illustrated in the embodiment of FIG. 11, may also include a motor 110 electrically coupled as an output load to the first contactless electrical power transfer system, as well as one or more linkages 122 coupled between the motor 110 and the wedge actuator 38, for transferring power (for example, mechanically) between the motor 110 and the wedge actuator 38.

Referring to FIGS. 10 and 11, in operation, the power supply 98 may feed power to the inductance track 96 which may then induce an electromagnetic response in the one or more inductor coils 100 as they rotate within the rotating ring 30. Each of the inductor coils 100 may maintain a constant distance from the inductance track 96, due to both the inductance track 96 and the rotating ring 30 being concentric about both the drill pipe 26 and centerline 28. The electromagnetic response in the inductor coils 100 may then be magnified, converted to DC, smoothed, and regulated at the respective pickup compensator 108, one or more rectifiers 106, and switched mode controllers 104, before reaching and powering the motor 110. As a result, power may be transferred from the static base 32 (or rig floor 34) to the rotating ring 30 and components disposed within the rotating ring 30, without the need for wires or electrical contacts.

Capacitive Power Transfer

Figure 12:
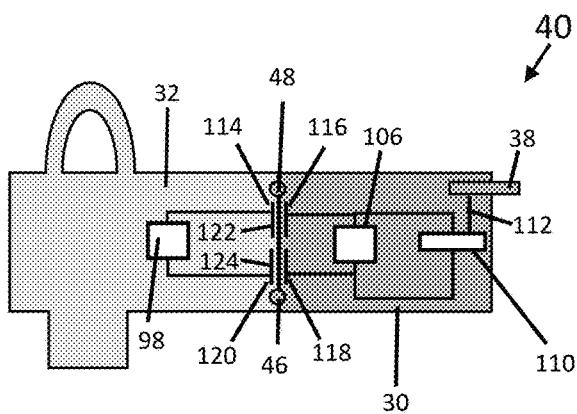
FIG. 12 illustrates a side view of a power slips system, in accordance with aspects of the present disclosed embodiments.

FIG. 12 illustrates a side view of an embodiment of the power slips system 40 according to aspects of the present disclosure. In the embodiment of FIG. 12, the power slips system 40 includes a second contactless electrical power transfer system which includes a capacitive inductive power transfer system. The second contactless electrical power transfer system may include a power supply 98 disposed in the static base 32 (or alternatively the rig floor 34) and electrically coupled to a first outer capacitor plate 114 disposed at the interface between the static base 32 and the rotating ring 30. Facing the first outer capacitor plate 114, a first inner capacitor plate 116 may be disposed in the rotating ring 30 at the interface with the static base 32. The first inner capacitor plate 116 may rotate with the rotating ring 30 and may be electrically coupled to a rectifier 106 (as well as one or more switched mode controllers 104 (shown in FIG. 11)). The rectifier 106 may be electrically coupled to a second inner capacitor plate 118, which may be disposed in the rotating ring 30 at the interface with the static base 32. Facing the second inner capacitor plate 118, a second outer capacitor plate 120 may be disposed in the static base 32 at the interface with the rotating ring 30, the second outer capacitor plate 120 being electrically coupled to the power supply 98. The rectifier 106 may be electrically coupled to an electrical load 110 (such as an electrical motor) which may be used to move the wedge actuator 38 via one or more linkages 112.

Referring still to FIG. 12, each of the capacitor plates 114, 116, 118, 120 may be planar or substantially planar thereby maximizing the capacitive area or flux across the capacitor plates 114, 116, 118, 120. Because the illustration of FIG. 12 is a side view, each of the capacitor plates 114, 116, 118, 120 appears as only a line segment rather than a plate. In the embodiment of FIG. 12, each of the capacitor plates 114, 116, 118, 120 may include multiple capacitor plates that circumferentially extend around (or within) the interface between the static base 32 and the rotating ring 30. For example, multiple first and second inner capacitor plates 116, 118 may circumferentially extend around the rotating ring 30 radially inward of the interface between the static base 32 and the rotating ring 30. Similarly, multiple first and second outer capacitor plates 114, 120 may circumferentially extend around the static base 32 radially outward of the interface between the static base 32 and the rotating ring 30. In one or more embodiments, each of the capacitor plates 114, 116, 118, 120 may be contoured to match the contouring of the interface between the static base 32 and the rotating ring 30. For example, each of the multiple first and second inner capacitor plates 116, 118 may include a convex contouring (when viewed from the interface between the static base 32 and the rotating ring 30), while each of the multiple first and second outer capacitor plates 114, 120 may include a concave contouring (when viewed from the interface between the static base 32 and the rotating ring 30). In other embodiments, each of the capacitor plates 114, 116, 118, 120 may include one continuous plate that circumferentially extends around or within the interface between the static base 32 and the rotating ring 30 such that each may include a cylindrical geometry (for example, with a greater diameter than height). In embodiments that include multiple plates, each of the capacitor plates 114, 116, 118, 120 may include from about 2 to about 30 or even 40 individual plates. In each embodiment, the inner and outer capacitor plates 114, 116, 118, 120 remain substantially parallel to the respective opposing plates, even while the rotating ring 30 is rotating.

Still referring to FIG. 12, each of the capacitor plates 114, 116, 118, 120 may be composed of aluminum (such as aluminum oxide, $Al_2O_3$), copper, tantalum (such as tantalum pentoxide, $Ta_2O_5$), silver, niobium (such as niobium oxide, $Nb_2O$) as well as other electrically conductive materials. Each of the inner capacitor plates 116, 118 may be spaced approximately three (3) inches or less from the closest outer capacitor plate 114, 120. In other embodiments, the inner and outer capacitor plates 114, 116, 118, 120 may be spaced less than two (2) inches apart. In other embodiments, the inner and outer capacitor plates 114, 116, 118, 120 may be spaced less than one (1) inch apart. In other embodiments, the inner and outer capacitor plates 114, 116, 118, 120 may be spaced less than one (1) centimeter apart. In other embodiments, the inner and outer capacitor plates 114, 116, 118, 120 may be spaced apart by a distance in a range from about three (3) millimeters to about seven (7) millimeters.

Referring still to FIG. 12, one or more materials may be used to increase the dielectric constant across each of the upper and lower capacitors 122, 124, thereby increasing the capacitance of each of the upper and lower capacitors 122, 124. For example, by minimizing the amount of air filling the gap between each of the inner and outer capacitor plates 114, 116, 118, 120, and replacing the air with materials with higher dielectric constants, capacitance may be increased. In one or more embodiments, some air may remain between the inner and outer capacitor plates 114, 116, 118, 120, however, the amount of air may be decreased. In one embodiment, a film, coating, wear material, or solid electrolyte may include polymer wear materials, manganese dioxide $MnO_2$, PEDOT, or poly-pyrrole (polypyrrole), and may be disposed on the surfaces of the inner and outer capacitor plates 114, 116, 118, 120, thereby acting to both increase the dielectric constant, as well as serving as a dry lubricant or wear surface. Other dielectric coatings, films, wear materials, and solid electrolytes may also be used. In other embodiments, one or more liquid electrolytes may be disposed between the inner and outer capacitor plates 114, 116, 118, 120, simultaneously acting as a lubricant, and also serving to increase the dielectric constants of the upper and lower capacitors 122, 124. Examples of liquid electrolytes may include ethylene glycol, borax (that is, boric acid), and organic solvents such as dimethylformamide, as well as dimethylacetamide dissolved in water. Other liquid electrolytes may also be used.

Still referring to FIG. 12, the electrolytic fluid may be contained within each of the upper and lower capacitors 122, 124 via the first and second dynamic seals 48, 46, which may be disposed longitudinally above and below the upper and lower capacitors 122, 124, and may circumferentially extend around the rotating ring 30 at the interface between the rotating ring 30 and the static base 42. The capacitance of the upper and lower capacitors 122, 124 may increase as the electrolytic fluid picks up heat from the motion of the rotating ring 30 rotating within the static base 32. Each of the one or more circuits of the second contactless electrical power transfer system of FIG. 12 may operate at frequencies in the MHz or GHz range, in order to minimize impedance. Similar to the inductive power transfer system of FIGS. 10 and 11, the capacitive electrical power transfer system of FIG. 12 allows power to be transferred from the static base 32 or rig floor 34 to the rotating ring 30 and components disposed within the rotating ring 30, without the need for wires or electrical contacts.

Resonant Power Transfer

Figure 13:
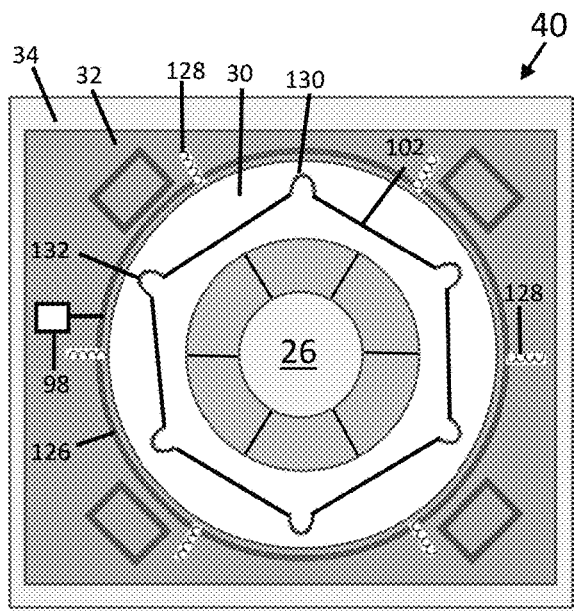
FIG. 13 illustrates a top view of a power slips system, in accordance with aspects of the present disclosed embodiments.

FIG. 13 illustrates a top view of an embodiment of the power slips system 40 according to aspects of the present disclosure. In the embodiment of FIG. 13, the power slips system 40 includes a third contactless electrical power transfer system which includes a magnetic resonance coupling power transfer system. The power slips system 40 of FIG. 13 may include one or more power supplies 98 disposed within the static base 32 (or alternately within or on the rig floor) coupled to one or more oscillators 126 disposed radially outward of the interface between the static base 32 and the rotating ring 30. The one or more oscillators 126 may include a plurality of outer inductor coils 128 connected in series and circumferentially spaced around the one or more oscillator 126. Each of the outer inductor coils 128 may be aligned such that a centerline of each coil is oriented radially. The power slips system may include one or more resonance circuits 130 (or RLC circuits) coupled together via one or more electrical couplings 102, each resonance circuit comprising at least one inner inductor coil 132, at least one capacitor 134, and at least one resistance element or load 106, 110 (all shown in FIGS. 14 and 15). As power is supplied by the power supply 98 to the oscillator 126, the oscillator 126 may become magnetically and resonantly coupled with the resonance circuit 130 disposed within the rotating ring 30.

Figure 14:
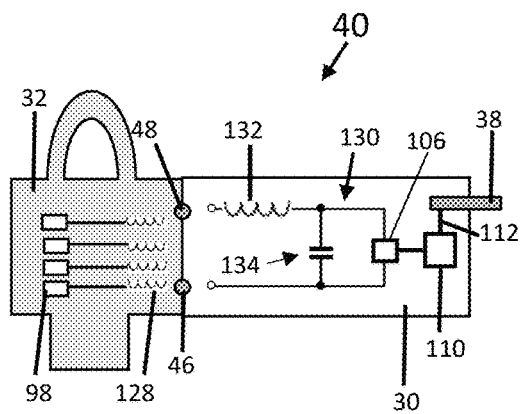
FIG. 14 illustrates a side view of a power slips system, in accordance with aspects of the present disclosed embodiments.

FIG. 14 illustrates details of the power slips system 40 shown in FIG. 13, including one possible resonance circuit 130 arrangement. The power slips system may include one or more power supplies 98 coupled to one or more oscillators 126, all disposed within the static base 32. Opposing the one or more outer inductor coil 128, radially inward of the interface between the static base 32 and the rotating ring 30 (the interface including the first and second dynamic seals 48, 46), the resonance circuit 130 may include an inner inductor coil 132 coupled to both a capacitor 134, and a resistive load 106, the capacitor 134 and resistive load being arranged in a parallel configuration. The resistive load may collectively include the rectifier 106 and motor 110, which may power the wedge actuator 38 via one or more linkages 112.

Figure 15:
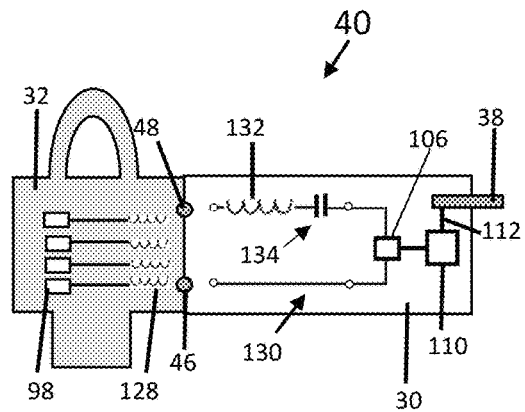
FIG. 15 illustrates a side view of a power slips system, in accordance with aspects of the present disclosed embodiments.

FIG. 15 illustrates details of the power slips system 40 shown in FIG. 13, including a second possible resonance circuit 130 arrangement. In the embodiment of FIG. 15, the resonance circuit 130 is arranged such that the capacitor 134 and the resistive load 106, 110 are in series rather than in parallel. Other resonance circuit configurations are possible, and may be used to create low-pass, band-pass, and high-pass (as well as parallel and in series) filters, in order to enhance the resonance coupling. In each of FIGS. 11, 13, 14, and 15, it may be beneficial for each of the inductor coils 100, 128, 132 to be aligned such that the respective centerlines are oriented radially inwardly or radially outwardly, so that the inductance field is always directed toward the respective pickup or source. Other methods and systems for implementing contactless electrical power transfer (that is, in addition to the three (3) systems included in the present disclosed embodiments) are also possible.

In operation, a top drive system (TDS) may disengage the drilling string in order to be used for making a connection with a new drill pipe 26 (or for breaking a connection with a pipe currently connected to the drilling string). The wedge actuators 38 may cause the slips wedges 36 to engage the drilling string or component thereof (for example a drill pipe 26 that is already connected within the drilling string, or a tool joint), thereby allowing the drilling string to be hung from the rotary table 42. The rotating ring 30 may not be initially rotating, but may accelerate as the one or more slips wedges 36 engage the drilling string, which continues to be rotated via the TDS. Once the drilling string is hung from the rotary table 42, the TDS may disengage the drilling string, as the rotary table 42 engages and takes over the function of rotating the drilling string. In one or more embodiments, a control system of the power slips system 40 may be integrated into a control system of the TDS, to ensure that the engaging and disengaging actions of both the power slips system 40 and the TDS are appropriately coordinated.

The present embodiments allow drill pipe 26 connections to be made or broken without requiring a drilling string to stop rotating, thereby reducing the likelihood of a stuck pipe occurrence. In addition, by transferring power to a rotating system that includes slips wedges 36 and wedge actuators 38, the one or more slips wedges 36 may engage or disengage at least one component of the drilling string, without requiring an operator to be nearby, thereby minimizing the risk of injury due to the release of a trapped deformation of the drilling string. The present embodiments may also reduce the likelihood of a drilling string being dropped due to the increased size of the slips wedges 36, thereby allowing more torque to be applied to the drilling string via the slips wedges 36. The slips wedges 36 of the present embodiments may also take torsional stresses (that is, due to the rotation of the drilling string) into account, and may accordingly include diagonal grips and other appropriate features, in order to minimize the chances of the drilling string being dropped. One or more possible systems for contactless electrical power transfer between the static and rotating components allow motors, piston, and other actuators to be disposed within the rotating system, obviating the need for external assistance (for example, direct operation intervention). In addition, one or more hydraulic power source arrangements may be used instead of a contactless electrical power transfer system, in order to achieve similar benefits.

Elements of different implementations described may be combined to form other implementations not specifically set forth previously. Elements may be left out of the processes described without adversely affecting their operation or the operation of the system in general. Furthermore, various separate elements may be combined into one or more individual elements to perform the functions described in this specification.

Other implementations not specifically described in this specification are also within the scope of the following claims.

The accompanying drawings, which are incorporated in and constitute a part of this specification, illustrate embodiments of the present disclosure and, together with the description, serve to explain the principles of the present embodiments.

Certain Definitions

In order for the present disclosure to be more readily understood, certain terms are first defined below. Additional definitions for the following terms and other terms are set forth throughout the specification.

An apparatus or method described herein as "comprising" one or more named elements or steps is open-ended, meaning that the named elements or steps are essential, but other elements or steps may be added within the scope of the apparatus or method. To avoid prolixity, it is also understood that any apparatus, system, or method described as "comprising" (or which "comprises") one or more named elements or steps also describes the corresponding, more limited system or method "consisting essentially of" (or which "consists essentially of") the same named elements or steps, meaning that the system or method includes the named essential elements or steps and may also include additional elements or steps that do not materially affect the basic and novel characteristic(s) of the system, apparatus or method. It is also understood that any apparatus, system, apparatus, or method described herein as "comprising" or "consisting essentially of" one or more named elements or steps also describes the corresponding, more limited, and closed-ended system, apparatus, or method "consisting of" (or "consists of") the named elements or steps to the exclusion of any other unnamed element or step. In any system, apparatus, or method disclosed herein, known or disclosed equivalents of any named essential element or step may be substituted for that element or step.

As used herein, the term "longitudinally" generally refers to the vertical direction, and may also refer to directions that are co-linear with or parallel to the centerlines of the drill string, and the borehole. Angles that are defined relative to a longitudinal direction may include both negative and positive angles. For example, a 30-degree angle relative to the longitudinal direction may include both an angle that is rotated clockwise 30 degrees from the vertical direction (that is, a positive 30-degree angle) as well as an angle that is rotated counterclockwise 30 degrees from the vertical direction (that is, a negative 30-degree angle).

As used herein, the term "radially" generally refers to any direction that is outwardly or inwardly directed from the center of a drill pipe (that is, a drill pipe centerline) or other circular, spherical, or cylindrical piece of equipment or object, for example, in increasingly larger radii of the drill pipe (or distances from the drill pipe centerline).

As used herein, the term "circumferentially" generally refers to a direction that follows or parallels the circumferences of a drill pipe or other circular, spherical, or cylindrical piece of equipment or object.

As used herein, the term "substantially" refers to the qualitative condition of exhibiting total or near-total extent or degree of a characteristic or property of interest.

EQUIVALENTS

It is to be understood that while the disclosure has been described in conjunction with the detailed description thereof, the foregoing description is intended to illustrate and not limit the scope of the invention(s). Other aspects, advantages, and modifications are within the scope of the claims.

This written description uses examples to disclose the invention, including the best mode, and also to enable any person skilled in the art to practice the present embodiments, including making and using any devices or systems and performing any incorporated methods. The patentable scope of the present embodiments is defined by the claims, and may include other examples that occur to those skilled in the art.

What is claimed is:
1. A rotational power slips system comprising:
a static base comprising at least one circular opening;
a rotating ring disposed within the static base, the rotating ring comprising a circular outer surface interfacing with the static base;
a plurality of slips wedges disposed at least partially within the rotating ring, each slips wedge of the plurality of slips wedges comprising a radially inner grip surface for gripping a component of a drilling string;
a plurality of wedge actuators, each wedge of the plurality of wedge actuators rotatably coupled to both the rotating ring and at least one slips wedge of the plurality of slips wedges, thereby causing the plurality of slips wedges to move while the at least one component of the drilling string is rotating, and
a contactless electrical power system for transferring power between the static base and the rotating ring.
2. The system of claim 1, where the contactless electrical power system transfers power to a motor disposed on or within the rotating ring.

3. The system of claim 2, where the contactless electrical power system comprises an inductive power transfer system comprising:
an inductance track disposed in the static base and extending circumferentially around the rotating ring; and
an inductor coil disposed within the rotating ring, the inductor coil electrically coupled to the motor.
4. The system of claim 2, where the contactless electrical power system comprises a capacitive power transfer system comprising:
an outer capacitor plate disposed within the static base; and
an inner capacitor plate disposed within the rotating ring, the inner capacitor plate facing the outer capacitor plate,
where the inner capacitor plate is electrically coupled to the motor.
5. The system of claim 4, where at least one of the outer capacitor plate and the inner capacitor plate comprises an electrolytic solid disposed thereon.
6. The system of claim 5, where the at least one electrolytic solid comprises at least one of a polymer wear material, manganese dioxide $MnO_2$, PEDOT, and poly-pyrrole (polypyrrole).
7. The system of claim 4, where a liquid electrolyte is disposed between the outer capacitor plate and the inner capacitor plate.
8. The system of claim 7, where the liquid electrolyte comprises at least one of ethylene glycol, boric acid, dimethylformamide, and dimethylacetamide.
9. The system of claim 7, further comprising:
a first dynamic seal disposed longitudinally above the liquid electrolyte; and
a second dynamic seal disposed longitudinally below the liquid electrolyte.
10. The system of claim 7, where the liquid electrolyte comprises at least one organic solvent.
11. The system of claim 4, where at least one of the outer capacitor plate and the inner capacitor plates comprises at least one of a copper material, an aluminum oxide material, a tantalum pentoxide material, and a niobium oxide material.
12. The system of claim 4, where the outer capacitor plate is concavely contoured, when viewed from an interface between the static base and the rotating ring, and
where the inner capacitor plate is convexly contoured, when viewed from the interface between the static base and the rotating ring.
13. The system of claim 2, where the contactless electrical power system comprises a resonant power transfer system comprising:
an outer inductor coil disposed in the static base; and
an inner inductor coil disposed within the rotating ring, the inner inductor coil electrically coupled to the motor.
14. The system of claim 13, where the outer inductor coil and the inner inductor coil are arranged such that each respective inductor coil centerline is oriented in a radial direction.
15. The system of claim 13, further comprising a capacitor electrically coupled to both the inner inductor coil and the motor.
16. The system of claim 1, where, in a closed position of the rotational power slips system, the component of the drilling string is hung from the rotating ring via the plurality of slips wedges.

17. The system of claim 1, where, in an open position of the rotational power slips system, the component of the drilling string does not contact any of the plurality of slips wedges.

18. The system of claim 1, where each wedge actuator of the plurality of wedge actuators is coupled to both the top of the rotating ring and the top of a slips wedge of the plurality of slips wedges.

19. The system of claim 1, where each wedge actuator of the plurality of wedge actuators is coupled to both a radially inner surface of the rotating ring and a circumferentially facing surface of slips wedge of the plurality of slips wedges.

20. The system of claim 1, further comprising a dynamic seal disposed at the interface between the rotating ring and the static base, the dynamic seal extending circumferentially around the rotating ring, radially outward of the rotating ring.

21. The system of claim 1, further comprising a hydraulic power source disposed on the static base for transmitting power from the static base to the rotating ring, where the hydraulic power source is fluidly coupled to the plurality of wedge actuators.

22. The system of claim 21, where the hydraulic power source comprises:
   a hydraulic fluid pressure source;
   a stationary fluid path fluidly coupled to the hydraulic fluid pressure source;
   a stationary fluid manifold fluidly coupled to the stationary fluid path; and
   a rotating fluid path fluidly coupled to both the stationary fluid manifold and at least one wedge actuator of the plurality of wedge actuators.

23. The system of claim 22, where the stationary fluid manifold extends circumferentially around the power slips system, radially outward of the rotating ring.

24. The system of claim 22, where each of the stationary fluid path, the stationary manifold, and the rotating fluid path are at least partially disposed within at least one of the static base and the rotating ring.

25. The system of claim 1, further comprising a sleeve bearing disposed at an interface between a static component and a rotating component.

26. The system of claim 1, further comprising an O-ring seal disposed at an interface between a static component and a rotating component.

27. A rotational power slips system comprising: a static system; and a rotating system disposed within a circular opening within the static system, the rotating system rotating within the static system, the static system vertically supporting the rotating system, the rotating system further comprising: a rotating ring; a plurality of wedge actuators coupled to the rotating ring; a plurality of slips wedges and; a rotary table comprising a detachable portion coupled to the rotary table via one or more threaded portions, the detachable portion defined by a parting line that includes the threaded portion and extends from the bottom of a rig floor radially inward toward the plurality of slips wedges; a hydraulic power source disposed on the static system for transmitting power from the static base to the rotating ring, where the hydraulic power source is fluidly coupled to the plurality of wedge actuators, the hydraulic power source comprising: a hydraulic fluid pressure source; a stationary fluid path fluidly coupled to the hydraulic fluid pressure source; a stationary fluid manifold fluidly coupled to the stationary fluid path; and a rotating fluid path fluidly coupled to both the stationary fluid manifold and at least one wedge actuator of the plurality of wedge actuators; where each slips wedge is coupled to at least one wedge actuator, and where the plurality of wedge actuators cause the plurality of slips wedges to move vertically while the rotating system rotates in a circumferential direction; and a contactless electrical power system for transferring power between the static base and the rotating ring.

28. A system for making or breaking a drilling string connection, the system comprising:
   a static system;
   a rotating system disposed within the static system, the rotating system comprising:
      a rotating ring interfacing with the static system;
      a plurality of wedge actuators coupled to the rotating ring;
      a plurality of slips wedges; and
      a drilling string disposed radially inward of the plurality of slips wedges,
   where each slips wedge is coupled to at least one wedge actuator and, in a closed position, the rotating ring, the plurality of wedge actuators, the plurality of slips wedges, and the drilling string rotate at the same rotational speed; and
   a contactless electrical power system for transferring power between the static system and the rotating system.

29. The system of claim 28, where the plurality of slips wedges engage the drilling string while both of the plurality of slips wedges and the drilling string are rotating.

30. The system of claim 28, where the plurality of slips wedges disengage the drilling string while both the plurality of slips wedges and the drilling string are rotating.

* * * * *